(12) United States Patent
Eusebi Borzelli et al.

(10) Patent No.: US 8,665,131 B2
(45) Date of Patent: Mar. 4, 2014

(54) TARGET DETECTION IN A SAR-IMAGED SEA AREA

(75) Inventors: Gian Luca Eusebi Borzelli, Rome (IT); Alissa Ioannone, Chieti (IT); Mario Costantini, Lapedona (IT)

(73) Assignee: Telespazio S.p.A., Rome (IT)

( * ) Notice: Subject to any disclaimer, the term of this patent is extended or adjusted under 35 U.S.C. 154(b) by 514 days.

(21) Appl. No.: 12/994,538

(22) PCT Filed: May 29, 2008

(86) PCT No.: PCT/IT2008/000357
§ 371 (c)(1),
(2), (4) Date: Mar. 23, 2011

(87) PCT Pub. No.: WO2009/144754
PCT Pub. Date: Dec. 3, 2009

(65) Prior Publication Data
US 2011/0169686 A1   Jul. 14, 2011

(51) Int. Cl.
*G01S 13/00* (2006.01)

(52) U.S. Cl.
USPC .......................................................... 342/25 R

(58) Field of Classification Search
USPC .......................................................... 342/25 R
See application file for complete search history.

(56) References Cited

PUBLICATIONS

Knut Eldhuset: "An Automatic Ship and Ship Wake Detection System for Spaceborne • SAR Images in Coastal Regions" IEEE Transactions on Geoscience and Remote Sensing, IEEE Service Center, Piscataway, NJ, US, vol. 34, No. 4, Jul. 1, 1996.*

Search Report and Written Opinion from corresponding application Serial No. PCT/IT2008/000357, dated Feb. 26, 2009.
"Algorithms for Ship Detection and Tracking Using Satellite Imagery", by J.K.E. Tunaley, *IEEE*, 2004, pp. 1804-1807.
"Detection of Targets in Non-Gaussian Sea Clutter", by G.V. Trunk et al, *IEEE Transactions on Aerospace and Electroinc Systems*, Sep. 1970, pp. 620-628.
"Satellite Imaging for Maritime Surveillance of the European Seas", by H. Geidanus, *Remote Sensing of the Euroepan Seas*, 2008, pp. 343-358.
"Ship Detection by the Radarsat SAR: Validation of Detection Model Predictions", by P.W. Vachon et al., *Canadian Journal of Remote Sensing*, Mar. 1997, pp. 48-59.
"An Automated Ship and Ship Wake Detection System for Spaceborne SAR Images in Coastal Regions", by K. Eldhuset, *IEEE*, 1996 pp. 1010-1019.
"The State-of-the-Art in Ship Detection in Synthetic Aperture Radar Imagery", by D.J. Crisp, *Australian Government Department of Defense*, 2004, pp. i-xiii and 1-116.

* cited by examiner

*Primary Examiner* — Timothy A Brainard
(74) *Attorney, Agent, or Firm* — Westman, Champlin & Koehler, P.A.

(57) ABSTRACT

Disclosed herein is a method of detecting a target in a sea area based on a Synthetic Aperture Radar (SAR) image thereof. The Synthetic Aperture Radar (SAR) image is made up of pixels, each having a respective magnitude. The method comprises computing a first reference quantity which characterizes a Poisson distribution assumed for the magnitudes that the pixels in the Synthetic Aperture Radar (SAR) image would have if the sea area were free of targets. The method further comprises selecting pixels in the Synthetic Aperture Radar (SAR) image, computing a real quantity which characterizes a real statistical distribution of the magnitudes of the selected pixels, and detecting a target in the sea area based on the computed first reference and real quantities. The selected pixels are in a one and the same sub-image of the Synthetic Aperture Radar (SAR) image, and detecting comprises detecting a target in a sea subarea of the sea area, the sea subarea being represented by the sub-image.

23 Claims, 6 Drawing Sheets

TARGET DETECTION IN A SAR-IMAGED SEA AREA

TECHNICAL FIELD OF THE INVENTION

The present invention relates to a target detection in a Synthetic-Aperture-Radar-imaged sea area.

BACKGROUND ART

As is known, remote sensing is the science and art of obtaining information about an object, area, or phenomenon through the analysis of data acquired by a device that is not in contact with the object, area, or phenomenon under investigation. Based on the wavelength in which the system works, remote sensing is principally categorized into two different groups, i.e., optical and microwave.

Optical remote sensing uses visible and infrared waves while microwave remote sensing uses radio waves.

As a microwave remote sensing system, a Synthetic Aperture Radar (SAR) system comprises a radar signal transmitter and a radar signal receiver operating on a movable platform, such as an aeroplane or satellite, and a remote processing station connected over a radio channel to the movable platform.

The transmitter sends a radar signal into a monitored ground or sea area, and the receiver receives the radar echo back-scattered by the area, and transmits it to the remote processing station, which processes the radar echo to obtain a two-dimensional map of the monitored area. The transmitted radar signal comprises a succession of microwave-band electromagnetic pulses modulated by linear frequency, or so-called CHIRP, modulation and transmitted at regular time intervals.

The processing station coherently combines the radar echoes corresponding to the transmitted pulses to obtain high-azimuth-resolution maps of extensive areas using relatively small transmitting antennas. CHIRP pulse modulation, on the other hand, provides for achieving high resolution perpendicular to the azimuth direction.

In detail, a SAR system illuminates a scene with microwaves by means of the transmitter, and records both amplitude and phase of the back-scattered radiation by means of the receiver, making it a coherent imaging process. The received signal is sampled and converted into a digital image by the processing station.

In particular, field recorded at pixel x, denoted E(x), can be written as $$E(x) = \sum_s a(s)e^{i\varphi(s)}h(s, x)$$

where the summation ranges over scatterers s, a(s) and φ(s) are respectively amplitude and phase of the signal received from the scatterer s, and h(s,x) is instrument or point-spread function. Value of h(s,x) is near 1 when the scatterer s is in or near the resolving cell corresponding to the pixel x, and near zero otherwise. Assuming that the instrument function is translation-invariant, i.e., it does not depend on x, then it can be written as a one-parameter function h(s−x).

The square of the modulus of the field E(x) is called detected intensity I(x); the square-root of the intensity I(x) is called envelope or amplitude. This is not the same as the amplitude of the received signal a(s) because the received field E(x) is perturbed by the instrument function h(s,x). The amplitude of the received signal a(s) is called reflectivity, and its square is called surface cross-section.

In compare to optical remote sensing, SAR imaging has some advantages. First, as an active system, it is a day/night data acquisition system. Second, considering the behaviour of electromagnetic waves in the range of SAR wavelength, it can be seen that atmospheric characteristics such as cloud, light rain, haze, and smoke has little effect on the capability of a SAR system. This makes SAR as an all-weather remote sensing system. Last but not least, as SAR signals partially penetrate into soil and vegetation canopy, in addition to surface information, it can provide subsurface information too.

Unfortunately, in compare to optical remote sensing, SAR imaging has some disadvantages too. In particular, unlike optical images, SAR images are formed by coherent interaction of the transmitted microwave with targets. Hence, SAR imaging suffers from the effects of speckle noise which arises from coherent summation of the signals back-scattered by ground scatterers s distributed randomly within each pixel x. Thus, a SAR image appears more noisy than an optical image.

More in detail, the waves emitted by the transmitter travel in phase and interact minimally on their way to the target area. After interaction with the target area, these waves are no longer in phase because of the different distances they travel from targets, or single versus multiple bounce scattering. Once out of phase, the back-scattered waves can interact to produce light and dark pixels. This effect is known as speckle noise.

The speckle noise gives a grainy appearance to the SAR images, reduces SAR image contrast, and has a negative effect on texture based analysis. Moreover, as the speckle noise changes spatial statistics of the SAR images, it makes the classification process a difficult task to do.

FIG. 1 shows an example of a typical grainy SAR image.

For this reason, the speckle noise is normally suppressed by applying a speckle removal filter on the digital image before display and further analysis.

FIG. 2 shows the grainy SAR image of FIG. 1 filtered with a speckle removal filter.

As shown in FIG. 1, a SAR image is usually displayed as a gray scale image. The intensity I(x) of each pixel x represents the portion of microwave back-scattered by a corresponding target area on the ground which portion depends on a variety of factors: types, sizes, shapes and orientations of the scatterers s in the target area, moisture content of the target area, frequency and polarization of the radar pulses, as well as the incident angles of the radar beam. The pixel intensity values are often converted into a physical quantity called back-scattering coefficient or normalized radar cross-section, which is measured in decibel (dB) units with values ranging from +5 dB for very bright objects to −40 dB for very dark surfaces.

Interpreting a SAR image is not a straightforward task. It very often requires some knowledge about the ground conditions of the areas imaged. As a useful rule of thumb, the higher the back-scattered intensity, the rougher is the surface being imaged.

In detail, flat surfaces such as paved roads, runways or calm water normally appear as dark areas in a SAR image since most of the incident radar pulses are specularly reflected away. FIG. 3 shows schematically an example of specular reflection. In detail, as shown in the FIG. 3, a smooth surface 31 acts like a mirror for the incident radar pulse. Most of the incident radar energy is reflected away according to the law of specular reflection, i.e. the angle of reflection α' is equal to the angle of incidence α. Very little energy is back-scattered to the SAR sensor.

On the contrary, a rough surface reflects the incident radar pulse in all directions. This phenomenon is called diffused reflection. In this case, part of the radar energy is scattered back to the radar sensor. The amount of energy back-scattered depends on the properties of the target on the ground. FIG. 4 shows schematically an example of diffused reflection in presence of a rough surface 41.

Therefore, calm sea surfaces appear dark in SAR images, while rough sea surfaces may appear bright, especially when the incidence angle is small and when the roughness of the sea surface is due to waves having wavelength shorter than the wavelength of the radar pulses.

Moreover, the presence of oil films smoothes out the sea surface. Under certain conditions when the sea surface is sufficiently rough, oil films can be detected as dark patches against a bright background.

Furthermore, trees and other vegetations are usually moderately rough on the wavelength scale. Hence, they appear as moderately bright features in the image. Tropical rain forests have a characteristic back-scattering coefficient of between −6 and −7 dB, which is spatially homogeneous and remains stable in time. For this reason, the tropical rain forests have been used as calibrating targets in performing radiometric calibration of SAR images.

Very bright targets may appear in a SAR image due to a phenomenon called corner-reflection or double-bounce effect. FIG. 5 shows schematically an example of double-bounce effect where the radar pulse bounces off a horizontal ground 51 towards a target 52, and then is reflected from one vertical surface 52a of the target 52 back to the SAR sensor. Examples of such targets are ships on the sea, high-rise buildings and regular metallic objects such as cargo containers. Built-up areas and many man-made features usually appear as bright patches in a SAR image due to the corner-reflection effect.

FIG. 6 shows a SAR image of an area of the sea near a busy port wherein many ships can be seen as bright spots due to the corner-reflection effect. The sea is calm, and hence the ships can be easily detected against the dark background.

Finally, brightness of areas covered by bare soil may vary from very dark to very bright depending on its roughness and moisture content. Typically, rough soil appears bright in the image. For similar soil roughness, the surface with a higher moisture content will appear brighter.

FIG. 7 shows schematically an example of radar pulse interaction with a dry soil 71, wherein some of the incident radar energy is able to penetrate into the soil surface 71a, resulting in a less back-scattered intensity.

FIG. 8 shows schematically an example of radar pulse interaction with a wet soil 81, wherein the large difference in electrical properties between water and air results in a higher back-scattered radar intensity.

FIG. 9 shows schematically an example of radar pulse interaction with a flooded soil 91, wherein the radar pulses are specularly reflected off the water surface 92, resulting in low back-scattered intensity. The flooded area will appear dark in the SAR image.

OBJECT AND SUMMARY OF THE INVENTION

The Applicant has noticed that in SAR images the speckle noise is strongly correlated with the useful signal and thus any speckle noise reduction/removal process modifies useful signal characteristics as well.

Therefore, the Applicant has carried out an in-depth study in order to develop an innovative method for detecting targets in a SAR-imaged sea area which doesn't need any kind of pre-processing of the SAR image, such as speckle noise reduction or removal, and, moreover, any a priori knowledge of the ground conditions of the imaged sea area.

The objective of present invention is then to provide a target detection method in a SAR-imaged sea area of the aforesaid type.

This objective is achieved by the present invention in that it relates to a method, a system, a device, and a software program for detecting a target, such as a ship, an oil film, an iceberg, a semiflooded structure or any other possible object, in a SAR-imaged sea area, as defined in the appended claims.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed.

Thus, the present invention is not intended to be limited only to the embodiments shown, but is to be accorded the widest scope consistent with the principles and features disclosed herein and defined in the appended claims.

Moreover, the present invention is implemented by means of a software program, loadable in a memory of an electronic processor, and comprising software code portions for implementing, when the software program is run on the processor, the target detection in a SAR-imaged sea area described hereinafter.

The present invention stems from the observation made by the Applicant that in a SAR image of a sea area, where no target is present, magnitudes of pixels are distributed according to a Poisson distribution. The magnitude may be an intensity value, a back-scattering coefficient or any other type of pixel magnitude used in SAR imaging.

Accordingly, the probability P(I) of the magnitude I is given by the following Poisson discrete probability function:

$$P(I) = \frac{\lambda^I e^{-\lambda}}{I!}$$

wherein $\lambda$ is the expected value or mean value of the magnitude I. Obviously, e is the base of the natural logarithm, while I! is the factorial of the magnitude I.

As easily understandable, given the mean value $\lambda$, the Poisson discrete probability function and then the Poisson distribution of the magnitudes I are univocally identified.

As is known, for the Poisson distribution the variance $\sigma^2$ and the expected value $\lambda$ coincide, i.e., results that $$\sigma^2 = \lambda$$

Obviously, the standard deviation $\sigma$ is equal to $\sqrt{\lambda}$.

Moreover, for the Poisson distribution the mode, i.e., probabilistically the most probable value or statistically the most frequently occurring value, is equal to $\lambda-1$, if $\lambda$ is an integer, or otherwise to $\lfloor \lambda \rfloor$.

Figure 1:
FIG. 1 shows a typical grainy SAR image.
Figure 2:
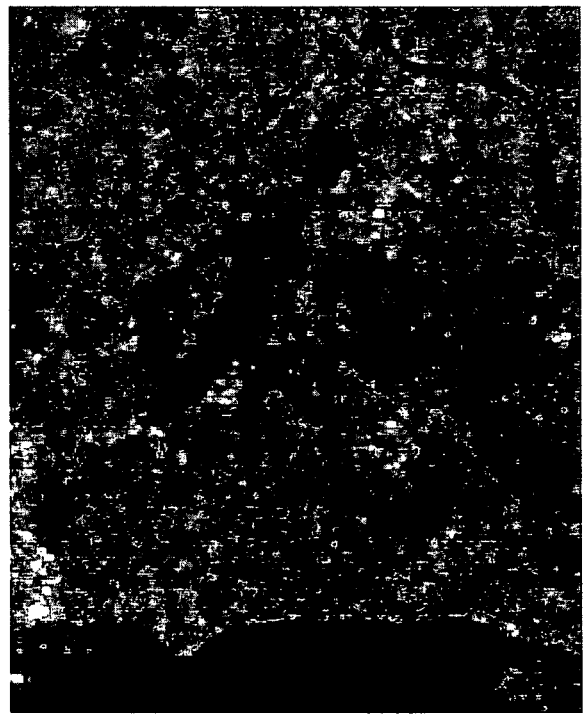
FIG. 2 shows the SAR image of FIG. 1 filtered with a speckle removal filter.
Figure 3:
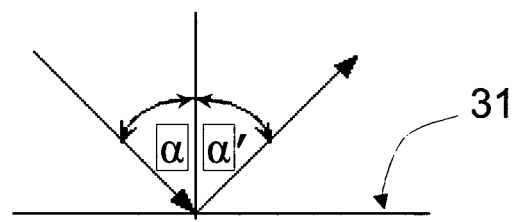
FIG. 3 shows schematically an example of specular reflection.
Figure 4:
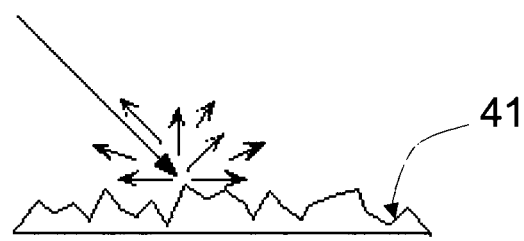
FIG. 4 shows schematically an example of diffused reflection.
Figure 5:
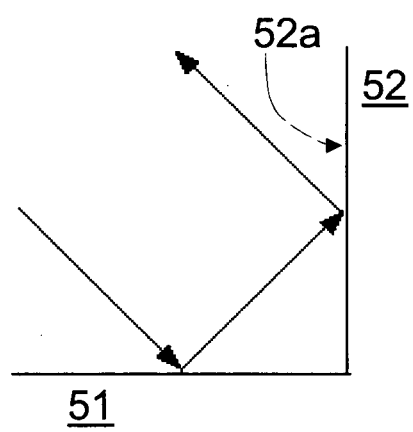
FIG. 5 shows schematically an example of double-bounce effect.
Figure 6:
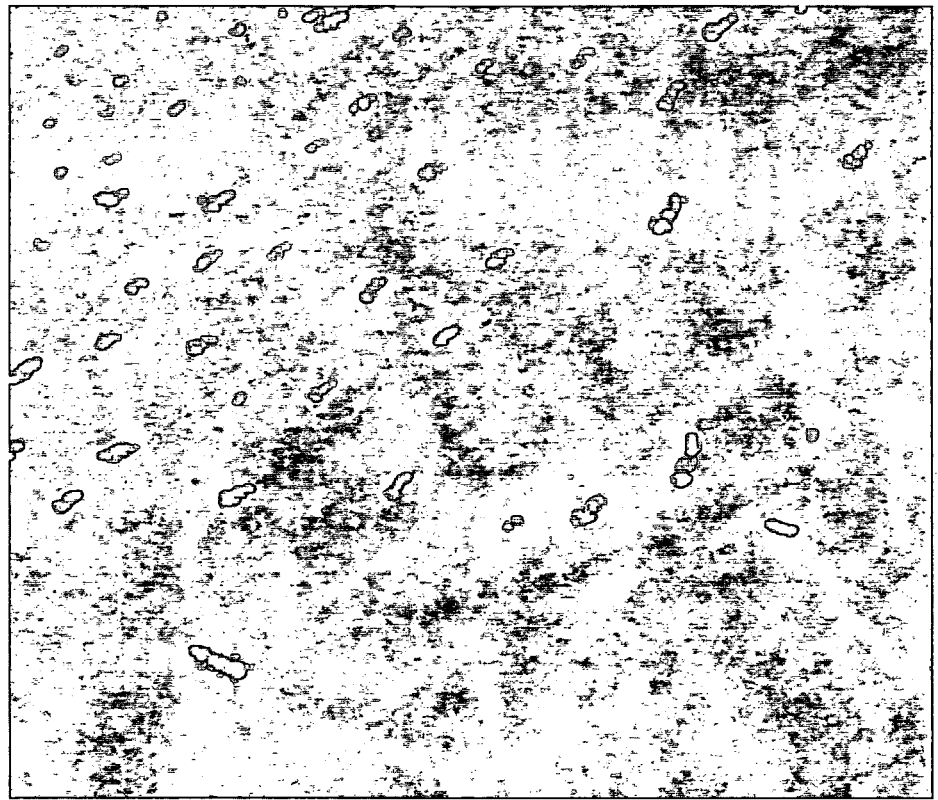
FIG. 6 shows a sea SAR image.
Figure 7:
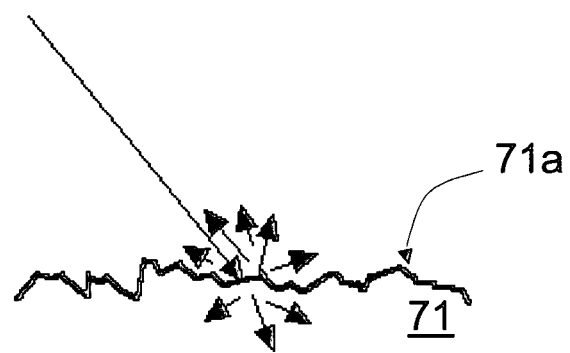
FIG. 7 shows schematically an example of radar pulse interaction with a dry soil.
Figure 8:
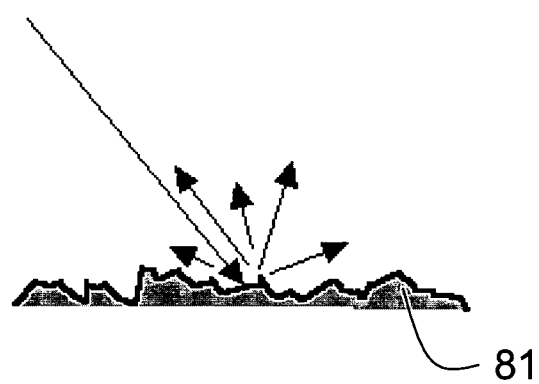
FIG. 8 shows schematically an example of radar pulse interaction with a wet soil.
Figure 9:
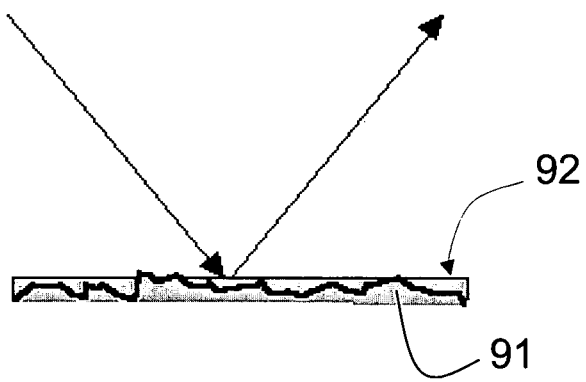
FIG. 9 shows schematically an example of radar pulse interaction with a flooded soil.
Figure 10:
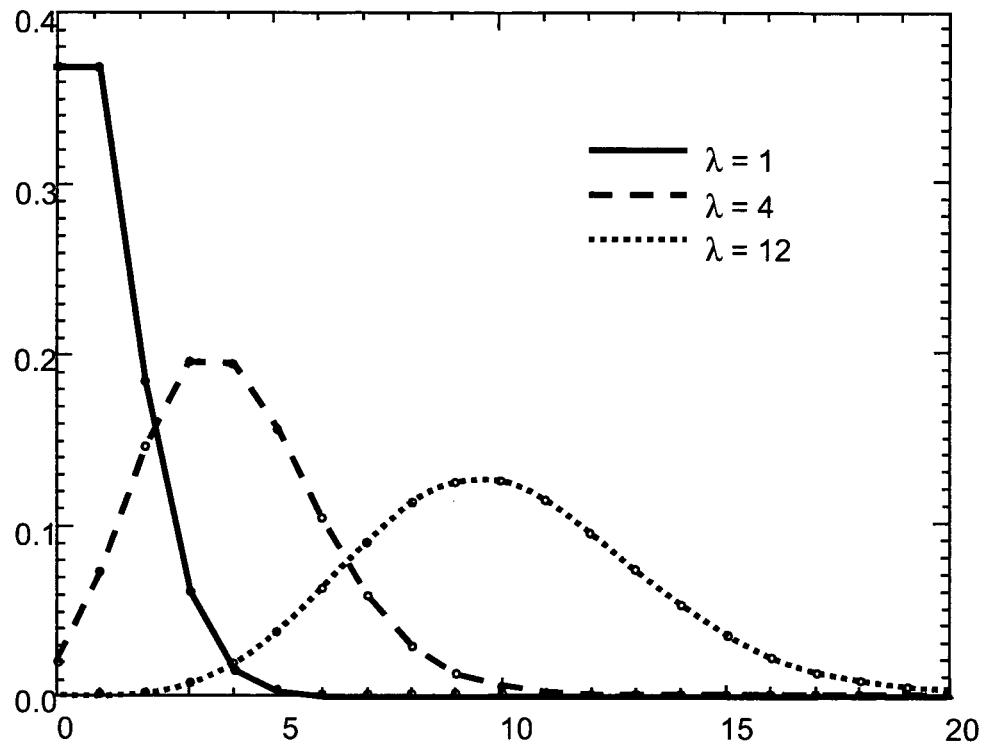
FIG. 10 shows graphic representations of Poisson discrete probability functions.

FIG. 10 shows a graphic representation of three Poisson discrete probability functions, each of them having a respective mean value $\lambda$.

Figure 11:
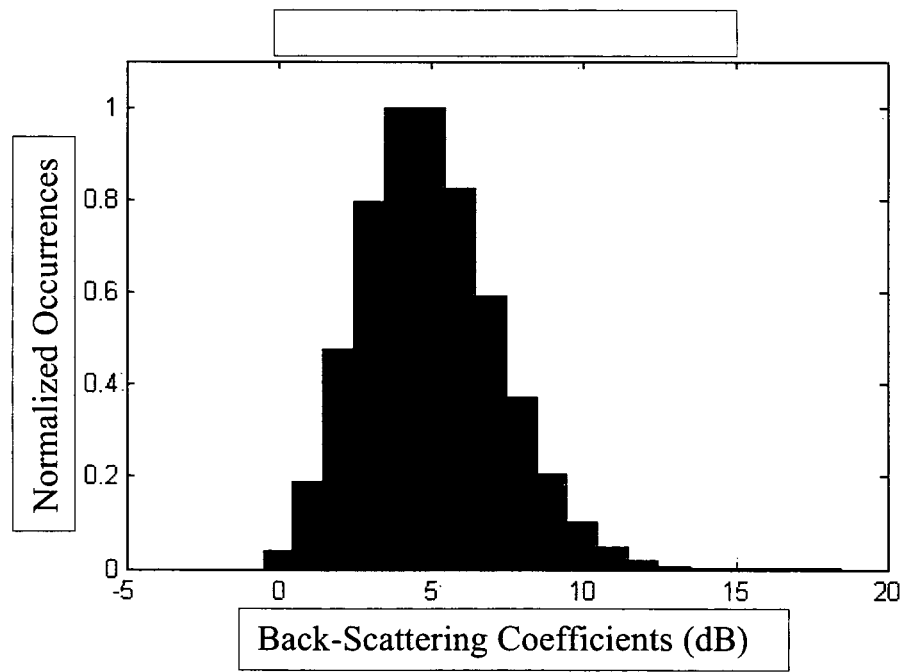
FIG. 11 shows a histogram of magnitudes of pixels in a typical SAR image of a sea area where no target is present.

FIG. 11 shows a histogram of magnitudes of a typical SAR image of a sea area where no target is present. In particular, the abscissa-axis represents back-scattering coefficients measured in decibel (dB), while the ordinate-axis represents normalized occurrences, i.e., the occurrences divided by the highest occurrence value. As shown in the FIG. 11, the back-scattering coefficients are distributed according to a Poisson distribution characterized by a mean value of 5 dB and a mode of 4 dB.

Figure 12:
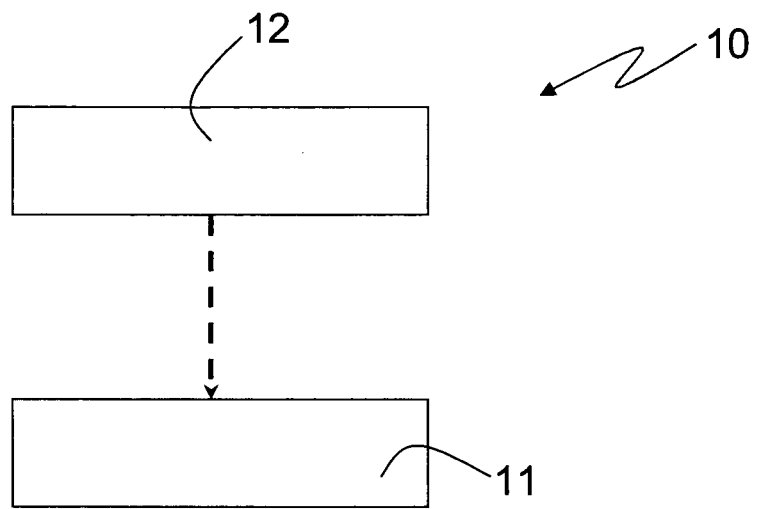
FIG. 12 shows schematically a system for detecting a target in a SAR-imaged sea area according to the present invention.

FIG. 12 shows schematically an electronic system for detecting a target in a SAR-imaged sea area according to the present invention.

In detail, the electronic system 10 comprises an electronic processor 11 coupled to a SAR system 12 to acquire data therefrom. In particular, the data acquired from the SAR system 12 are SAR images representing sea areas.

Moreover, on the electronic processor 11 is installed a software program comprising software code portions for implementing the target detection in a SAR-imaged sea area described hereinafter.

Figure 13:
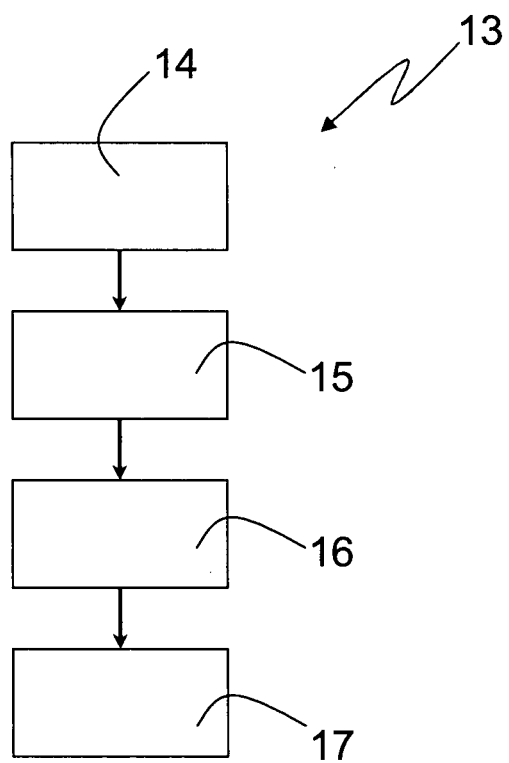
FIG. 13 shows a flow chart of a target detection in a SAR-imaged sea area according to the present invention.

FIG. 13 shows a flow chart of a target detection 13 in a sea area represented by a SAR image, according to the present invention.

In particular, the target detection 13 comprises:
computing a reference quantity (block 14);
selecting pixels in the SAR image (block 15);
computing a real quantity (block 16); and
detecting (block 17) a target in the sea area.

In detail, computing a reference quantity (block 14) comprises computing a reference quantity characterizing a Poisson distribution assumed for magnitudes that the pixels in the SAR image would have if the sea area were free of targets.

In other words, computing a reference quantity (block 14) comprises estimating a mean value $\bar{I}$ of the magnitudes I of the pixels in the SAR image, the SAR image made up of M×N pixels and representing the sea area. Accordingly, the reference quantity is the estimated mean value $\bar{I}$.

More in detail, the mean value $\bar{I}$ is estimated according to the following formula:

$$\bar{I} = \frac{1}{MN} \sum_{i=1}^{M} \sum_{j=1}^{N} I(i, j)$$

wherein I(i,j) is the magnitude of the pixel (i,j).

According to the philosophy underlying the present invention, if there were no target, such as a ship, an oil film, an iceberg, a semiflooded structure or any other possible object, in the sea area represented by the M×N pixels, the magnitudes I of the M×N pixels would be distributed according to a no-target-reference statistical distribution which is a Poisson distribution characterized by an expected value equal to the estimated mean value $\bar{I}$. Accordingly, the no-target-reference probability P(I) of the magnitude I is given by the following Poisson discrete probability function:

$$P(I) = \frac{\bar{I}^I e^{-\bar{I}}}{I!}$$

Therefore, the magnitude that occurs the most frequently, i.e., the mode I* of the no-target-reference statistical distribution, is equal to $\bar{I}-1$, if $\bar{I}$ is an integer, or otherwise to $\lfloor \bar{I} \rfloor$.

Accordingly, the standard deviation $\bar{\sigma}$ of the no-target-reference statistical distribution is equal to $$\sqrt{\bar{I}}.$$

Then, selecting pixels in the SAR image (block 15) comprises selecting a sub-image of the SAR image, the sub-image made up of m×n pixels, with m≤M and n≤N, and representing a corresponding sea subarea of the sea area.

Operatively, selecting pixels in the SAR image (block 15) may be conveniently performed using a selecting window movable inside the SAR image and comprising m×n pixels.

Moreover, computing a real quantity (block 16) comprises computing a real quantity characterizing a real statistical distribution of the magnitudes of the selected pixels.

In detail, computing a real quantity (block 16) comprises:
computing a histogram of the magnitudes I of the selected pixels, the histogram representing the real statistical distribution of the magnitudes I of the selected pixels; and
identifying in the histogram the magnitude value $I_M$ that occurs the most frequently and which represents the mode of the real statistical distribution.

Accordingly, the real quantity is the identified mode.

Furthermore, detecting (block 17) comprises:
comparing the no-target-reference statistical distribution with the real statistical distribution, and
detecting a target, such as a ship, an oil film, an iceberg, a semiflooded structure or any other possible object, in the sea subarea represented by the selected pixels based on comparing.

In particular, comparing takes sensing error into account, the sensing error being due to non-ideal nature of the sensing system, i.e., the SAR system, and to many other causes, such as the Doppler shift due to relative motion of the SAR movable platform and possible targets on sea surface.

In detail, comparing provides for the no-target-reference statistical distribution and the real statistical distribution to be considered equivalent if the respective modes I* and $I_M$ differ less than a detection threshold T representing the sensing error, while comparing provides for the no-target-reference statistical distribution and the real statistical distribution to be not considered equivalent, and then a target to be detected in the sea subarea represented by the selected pixels, if the respective modes I* and $I_M$ differ more than the detection threshold T representing the sensing error.

In more detail, the no-target-reference statistical distribution and the real statistical distribution are considered equivalent if it results that $$I^* - I_M \leq T$$

while the no-target-reference statistical distribution and the real statistical distribution are not considered equivalent, and then a target is detected in the sea subarea represented by the selected pixels, if it results that $$I^* - I_M > T$$

Conveniently, the detection threshold T may be set equal to $$\frac{\overline{\sigma}}{3}.$$

Conveniently, the sensing error represented by the detection threshold T may be more reliably estimated considering several SAR images representing the same sea area and acquired very closely in time in order to have very correlated useful signals and uncorrelated speckle noise.

Accordingly, a mean value $M_I$ of the magnitudes of the pixels in the several SAR images is computed according to the following formula:

$$M_I = \frac{1}{MNK} \sum_{k=1}^{K} \sum_{i=1}^{M} \sum_{j=1}^{N} I_k(i, j)$$

wherein K is the number of the SAR images considered for $M_I$ computation, and $I_k(i,j)$ is the magnitude of the pixel (i,j) in the k-th SAR image.

Therefore, a standard deviation $\sigma_M$ based on the computed mean value $M_I$ is computed according to the following formula:

$$\sigma_M = \sqrt{M_I}$$

Accordingly, the detection threshold T is set equal to $$\frac{\sigma_M}{3}.$$

Furthermore, in another possible embodiment of the present invention computing a reference quantity (block 14) may be also based on considering several SAR images representing the same sea area and acquired very closely in time. Therefore, in this case, the no-target-reference statistical distribution is a Poisson distribution characterized by an expected value equal to the computed mean value $M_I$. In this case, the mode M* of the no-target-reference statistical distribution is equal to $M_I - 1$, if $M_I$ is an integer, or otherwise to $\lfloor M_I \rfloor$, Accordingly, in relation to detecting (block 17), the no-target-reference statistical distribution and the real statistical distribution are considered equivalent if it results that $$M^* - I_M \leq T$$

while the no-target-reference statistical distribution and the real statistical distribution are not considered equivalent, and then a target is detected in the sea subarea represented by the selected pixels, if it results that $$M^* - I_M > T$$

In this case, the detection threshold T is set equal to $$\frac{\sigma_M}{3}.$$

From the foregoing, it may be immediately appreciated that the present invention permits a reliable and performant detection of targets in SAR-imaged sea areas by means of a computationally-light processing without needing any kind of pre-processing of the SAR image, such as speckle noise reduction or removal, and any a priori knowledge of the ground conditions of the sea area imaged.

Finally, it is clear that numerous modifications and variants can be made to the present invention, all falling within the scope of the invention, as defined in the appended claims.

The invention claimed is:

1. Method of detecting a target in a sea area based on a Synthetic Aperture Radar (SAR) image thereof, the Synthetic Aperture Radar (SAR) image made up of pixels, each having a respective magnitude, the method comprising:
using an electronic processor to compute a first reference quantity characterizing a Poisson distribution assumed for the magnitudes that the pixels in the Synthetic Aperture Radar (SAR) image would have if the sea area were free of targets;
selecting pixels in the Synthetic Aperture Radar (SAR) image;
computing a real quantity characterizing a real statistical distribution of the magnitudes of the selected pixels; and
detecting a target in the sea area based on the computed first reference and real quantities.

2. The method of claim 1, wherein the selected pixels are in a one and the same sub-image of the Synthetic Aperture Radar (SAR) image, and detecting comprises detecting a target in a sea subarea of the sea area, the sea subarea being represented by the sub-image.

3. The method of claim 1, wherein the first reference quantity is indicative of a mean value of the magnitudes of the pixels in the Synthetic Aperture Radar (SAR) image.

4. The method of claim 1, wherein computing a first reference quantity (block 14) is based on some Synthetic Aperture Radar (SAR) images of the sea area, each representing the sea area at a respective time.

5. The method of claim 4, wherein the first reference quantity is indicative of a mean value of the magnitudes of the pixels in said some Synthetic Aperture Radar (SAR) images.

6. The method of claim 1, wherein the Poisson distribution is characterized by an expected value based on the first reference quantity.

7. The method of claim 1, wherein the Poisson distribution is characterized by an expected value equal to the first reference quantity.

8. The method of claim 1, wherein computing a real quantity (block 15) comprises computing a histogram of the magnitudes of the selected pixels, and providing the real quantity based on the histogram.

9. The method of claim 1, wherein detecting comprises:
comparing the real quantity with a second reference quantity, the real quantity and the second reference quantity being indicative of a one and the same characteristic value of, respectively, the real statistical distribution and the Poisson distribution; and
detecting a target based on comparing.

10. The method of claim 9, wherein the characteristic value is the most frequently occurring magnitude.

11. The method of claim 9, wherein detecting a target based on comparing comprises detecting a target when comparing satisfies a given condition.

12. The method of claim 11, wherein said given condition is defined by the fact that a difference between the second reference and real quantities is greater than a detection threshold.

13. The method of claim 12, wherein the detection threshold is based on the Poisson distribution.

14. The method of claim 12, wherein the detection threshold is based on the standard deviation of the Poisson distribution.

15. The method of claim 12, wherein the detection threshold is equal to a fraction of the standard deviation of the Poisson distribution.

16. The method of claim 12, wherein the detection threshold is equal to a third of the standard deviation of the Poisson distribution.

17. The method of claim 12, further comprising:
computing a third reference quantity which is indicative of a mean value of the magnitudes of the pixels in some Synthetic Aperture Radar (SAR) images of the sea area, each Synthetic Aperture Radar (SAR) image representing the sea area at a respective time; and
characterizing a second Poisson distribution by basing the corresponding expected value on the third reference quantity; and
wherein the detection threshold is based on the second Poisson distribution.

18. The method of claim 17, wherein the second Poisson distribution is characterized by an expected value equal to the third reference quantity.

19. The method of claim 17, wherein the detection threshold is based on the standard deviation of the second Poisson distribution.

20. The method of claim 17, wherein the detection threshold is equal to a fraction of the standard deviation of the second Poisson distribution.

21. The method of claim 17, wherein the detection threshold is equal to a third of the standard deviation of the second Poisson distribution.

22. An electronic system for detecting a target in a sea area based on a Synthetic Aperture Radar (SAR) image thereof, the Synthetic Aperture Radar (SAR) image made up of pixels, each having a respective magnitude, the electronic system comprising:
an electronic processor coupled to a Synthetic Aperture Radar (SAR) system to acquire data therefrom, and
a software program comprising software code portions which, when the software program is run on the electronic processor, configures the electronic system to:
compute a first reference quantity characterizing a Poisson distribution assumed for the magnitudes that the pixels in the Synthetic Aperture Radar (SAR) image would have if the sea area were free of targets;
select pixels in the Synthetic Aperture Radar (SAR) image;
compute a real quantity characterizing a real statistical distribution of the magnitudes of the selected pixels; and
detect a target in the sea area based on the computed first reference and real quantities.

23. An electronic device for detecting a target in a sea area based on a Synthetic Aperture Radar (SAR) image thereof, the Synthetic Aperture Radar (SAR) image made up of pixels, each having a respective magnitude, the electronic device being configured to:
compute a first reference quantity characterizing a Poisson distribution assumed for the magnitudes that the pixels in the Synthetic Aperture Radar (SAR) image would have if the sea area were free of targets;
select pixels in the Synthetic Aperture Radar (SAR) image;
compute a real quantity characterizing a real statistical distribution of the magnitudes of the selected pixels; and
detect a target in the sea area based on the computed first reference and real quantities.

* * * * *

UNITED STATES PATENT AND TRADEMARK OFFICE
CERTIFICATE OF CORRECTION

PATENT NO. : 8,665,131 B2
APPLICATION NO. : 12/994538
DATED : March 4, 2014
INVENTOR(S) : Eusebi Borzelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Twenty-ninth Day of September, 2015

Michelle K. Lee
*Director of the United States Patent and Trademark Office*